3,578,626
PROCESS FOR THE POLYMERIZATION OF ACETYLENE COMPOUNDS
Walter A. Kornicker, Brookline, Mass., assignor to Monsanto Company, St. Louis, Mo.
Original application July 30, 1965, Ser. No. 475,918. Divided and this application Feb. 24, 1969, Ser. No. 832,516
Int. Cl. C08f 9/00, 9/02
U.S. Cl. 260—94.1                                  1 Claim

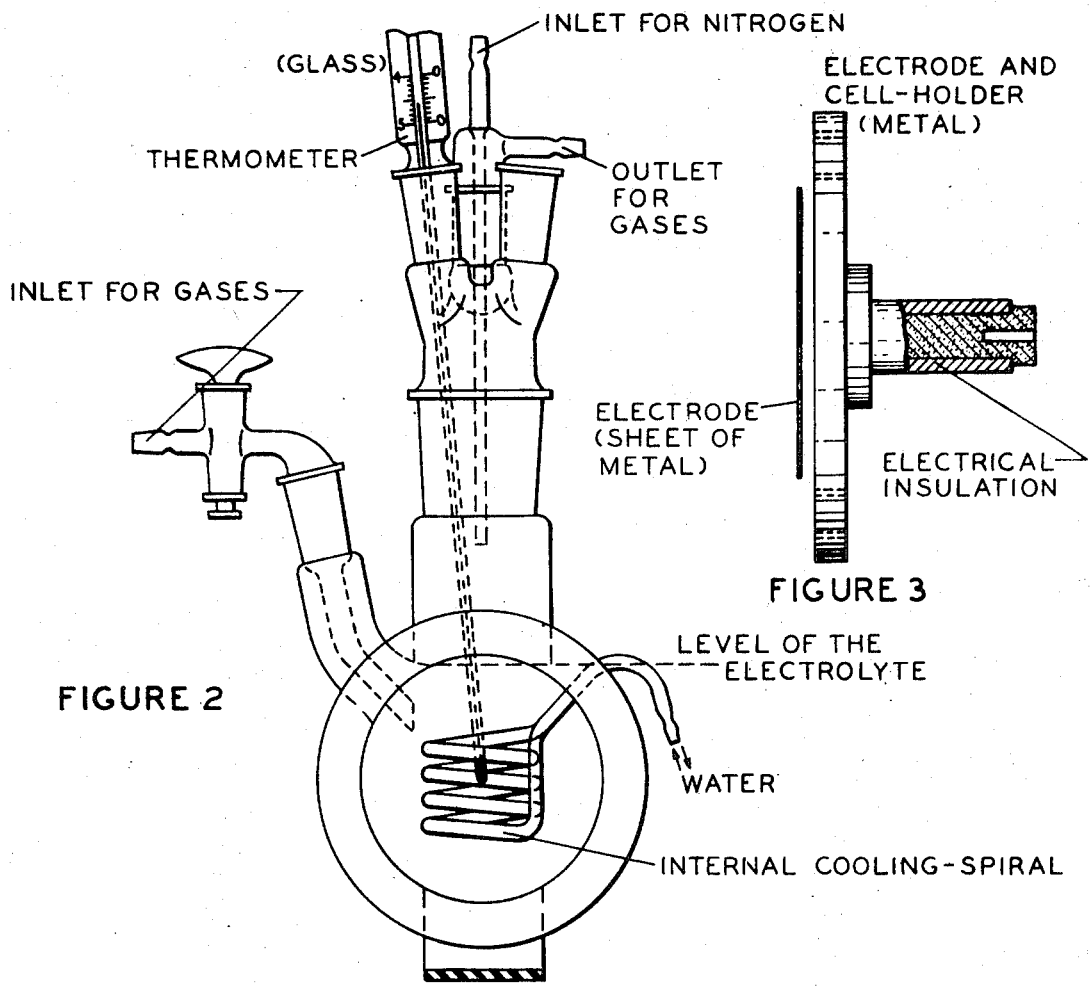
FIGURE 2
FIGURE 3
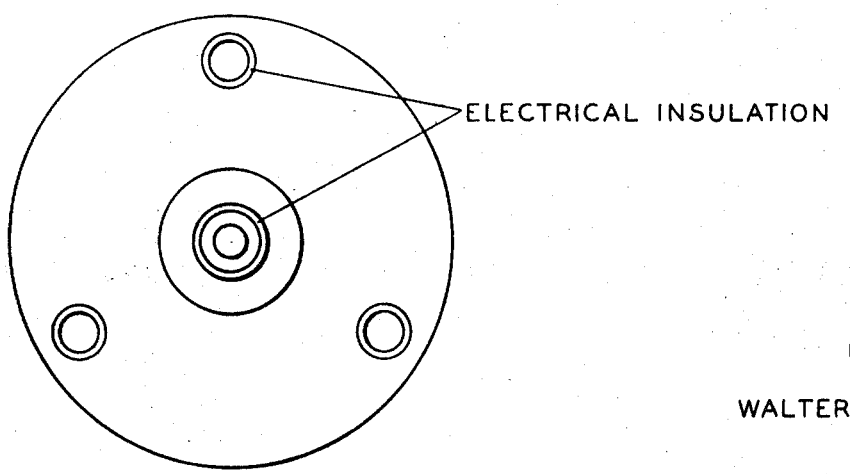
FIGURE 4
INVENTOR
WALTER A. KORNICKER
ATTORNEY //United States Patent Office 3,578,626
Patented May 11, 1971

ABSTRACT OF THE DISCLOSURE

As a new composition of matter solid linear crystalline trans-polyacetylene having nickel therein. The product is produced by a process of polymerizing acetylene or acetylenic compounds by subjecting to electrolysis the complex compound of a nickel dihalide and an electron donor and acetylene or an acetylenic compound or mixtures thereof in the presence of an inert polar solvent.

Figure 1:
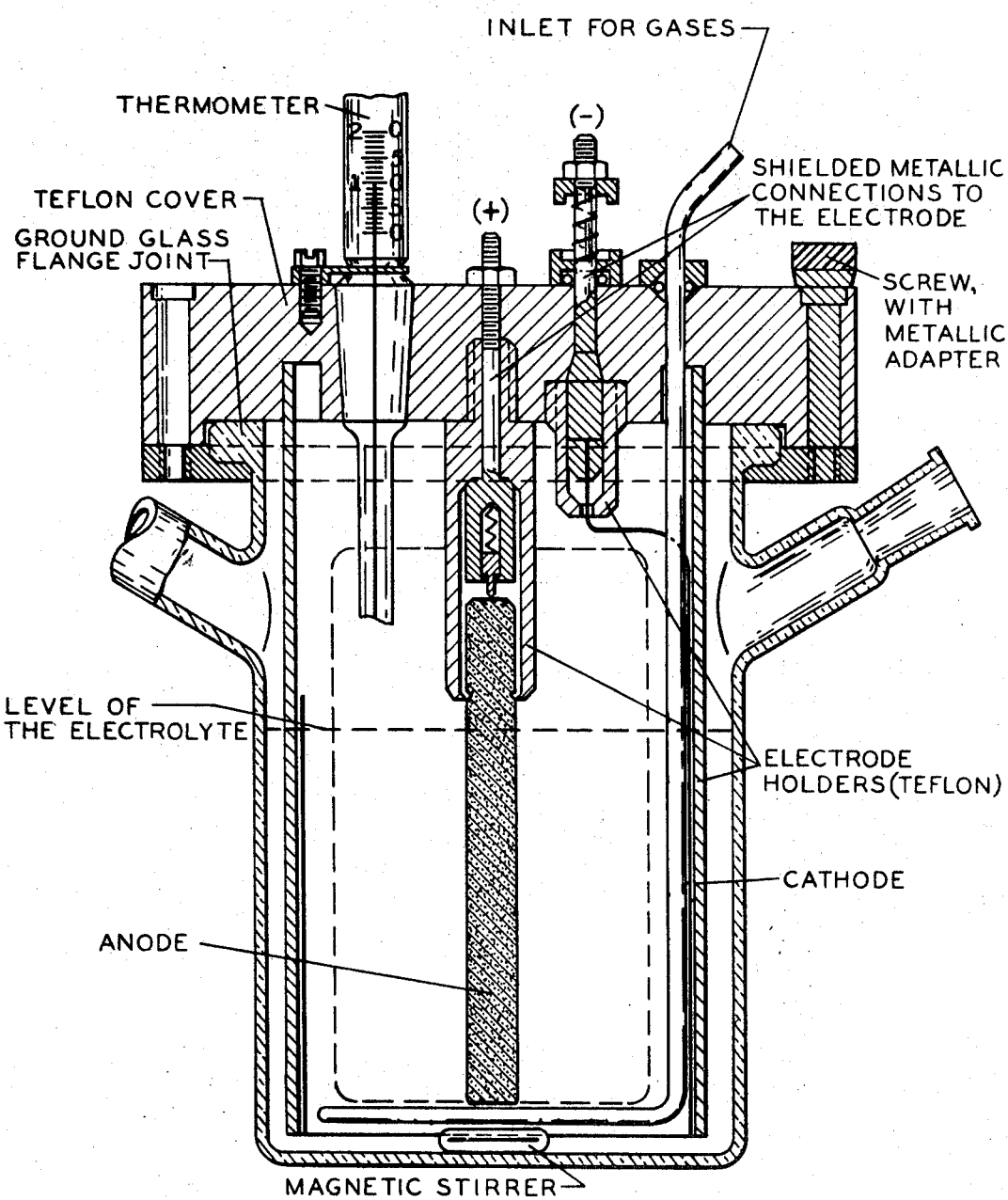
Figure 5:
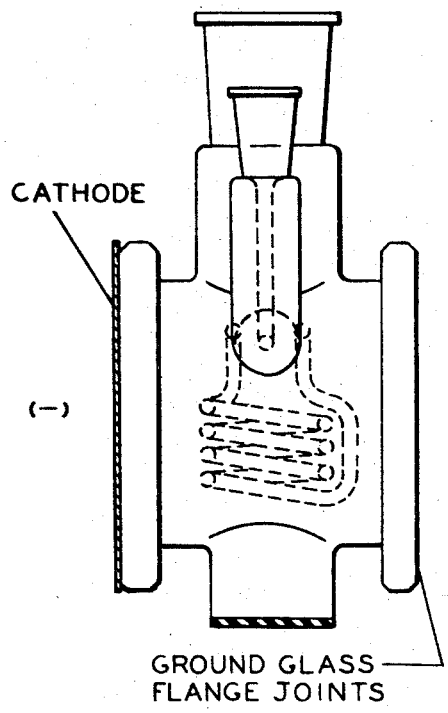
Figure 6:
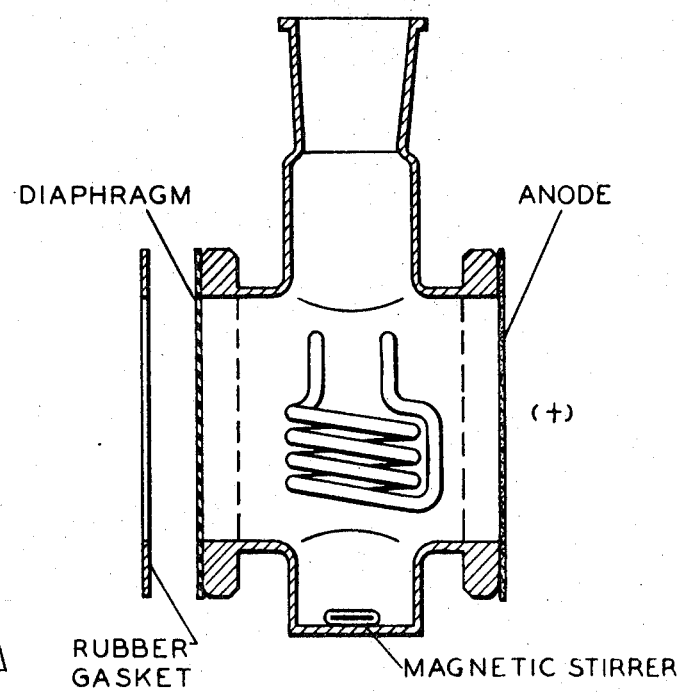
Figure 7:
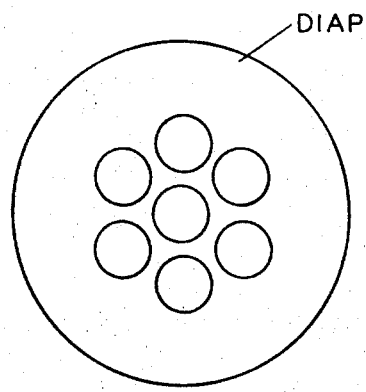

This application is a division of applicant's copending application Ser. No. 475,918, filed July 30, 1965.

It is known that carbonyls of iron, cobalt and nickel, as well as also many of their organic and inorganic derivatives, are catalysts for the polymerization of acetylene compounds in which the catalytic activity of a particular metal carbonyl derivative can be notably specific for a given monomer. Polymerization is defined for the purposes of this specification and the claim to cover dimerization, trimerization and the formation of higher polymers.

With a catalyst of the formula $Ni(CO)_a(PPh_3)_{4-a}$, the acetylenes and substituted acetylenes, for example, propargyl alcohol (W. Reppe and W. J. Schweckendiek, Ann. 560, 104 (1948)), phenylacetylene, phenylethinylcarbinol (J. D. Rose and F. S. Statham, J. Chem. Soc., 69 (1950)), 3 - methyl - 1 - butine - 3 - ol, isopropenylacetylene (C. H. McKeever and J. O. Van Hook, U.S. Pat. 2,542,551 (Feb. 20, 1951)), 2-butine-1,4-diol (R. F. Kleinschmidt, U.S. Pat. 2,542,417 (Feb. 20, 1951)), vinylacetylene (British Pat. 824,417 (Dec. 2, 1959)), and bis(trifluoromethyl) acetylene (J. F. Harris, Jr., U.S. Pat. 2,923,746 (Feb. 2, 1960)), or acetylene plus divinylacetylene (C. T. Handy, French Pat. 1,213,148 (Mar. 29, 1960)) and acetylene plus 2-butine (J. C. Sauer and T. L. Cairns, J. Am. Chem. Soc., 79, 2659 (1957)), could be trimerized or copolymerized to the corresponding benzene derivatives. The composition of this catalyst seems to be very specific because if $a=1$ or 0, no polymerization occurs, for example, with 1-heptine.

Later it was also announced (J. Org. Chem., 26, 5155 (1961)), that with bis(triphenylphosphine)nickeldicarbonyl at higher temperatures (boiling benzene, acetonitrile, cyclohexane), in addition to trisubstituted benzenes such as 1,2,4 - trimethylbenzene, 1,3,5 - triethylbenzene, 1,2,4- and 1,3,5-tripropylbenzene and 1,2,4-triphenylbenzene, linear dimers and oligomers are also obtained. These correspond, if the monosubstituted acetylene has the formula $RC \equiv CH$, to the formulas

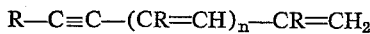
and
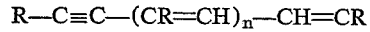

in which R means an alkyl with up to 5 carbon atoms, a diethylmethyl, α-hydroxyisopropyl, β-methoxyvinyl, cyclohexyl, α-hydroxycyclohexyl, phenyl, or p-nitrophenyl; and $n$ ranges from 0 to about 8–10. Also, with terminal, non-conjugated acetylenes, mixtures of various end products (linear and cyclic) are obtained. For example, with 1,6-heptadiine 75–80% viscous, non-distillable, brown tar, which was soluble in benzene or cyclohexane and gradually hardens in air in addition to 20–25% of aromatic trimers, i.e. 1,3-bis(5-indanyl)propane.

With other monosubstituted acetylenes in which R was methylol, vinyl, isopropenyl, carbomethoxy, carbethoxy, phenoxy or acetyl; or with butadiine, there were obtained, however, aromatic products exclusively, such as 1,2,4- and 1,3,5 - trimethylolbenzene, 1,2,4 - trivinylbenezene, 1,2,4-triisopropenylbenzene, 1,2,4-tris(carbomethoxy)benzene, 1,3,5-tris(carbethoxy)benzene, 1,2,4- and 1,3,5-tris (phenoxy)benzene, and 1,3,5-triacetylbenzene or 1,3,5- and 1,2,4-tris(1-ethenyl)benzene.

Generally, with the catalysts named, no polymerization could be effected in 2-butine, 3-hexine, diphenylacetylene, 2,5 - dimethyl-3-hexine-2,5-diol, 3,6-dimethyl-4-octine-3,6-diol, 1,4-dichloro-2-butine, 2-butine-1,4-diacetate, acetylenedicarboxylic acid, dicarbethoxyacetylene, 2,7-dimethyl-3,5 - octine-2,7-diol, 1,8-dimethoxy-1,7-octadiene-3,5-diine and 1,4-bis(1-hydroxycyclohexyl)buta-1,3-diine, because the Reppe catalyst is, insofar as is konwn, effective only in α-acetylenes. An exception is 2-butine-1-ol, 2-butine-1,4-diol and 1-phenyl-1,3-pentadiine-5-ol, which, however, also give only aromatic product. Because of immediate decomposition of the catalyst by acetylene halide, even if the chlorine is further removed as in 5-chloro-1-pentine, or by acetylenes containing carboxyl, such as propiolic acid, acetylene dicarboxylic acid and because of inhibition of the catalyst by the coordination of nickel through the N-atoms of amides and nitriles, such as propiolamides and cyanoethylene, these monomers, too, cannot be polymerized according to the known processes.

It is therefore desirable to have catalysts with which such special monomers can possibly be polymerized.

Thus, insofar as acetylene monomers can be polymerized with the Reppe catalysts, it is a case of final products being either exclusively cyclic trimers, or mixtures of such with lower oligomers. In spite of a good conversion of the monomers, polymers (aromatic and linear oligomers) were seldom isolated in more than 30–40%, as a result of tar formation. A high molecular, crystalline polyacetylene has not been described.

The originally introduced nickel complex was always decomposed in the productive reaction, and, according to the reaction conditions, it was converted into triphenylphosphine or its oxide and into a nickel metal or its salt (oxide, hydroxide). Further, some carbon monoxide from the catalyst seemed to be built up into the oligoacetylene, since products containing significant carbonyl are given off.

It is further known (W. Reppe et al., Ann. 560, 1 (1948); N. Hagihara, Chem. Abstr. 47, 104901 (1953)) that acetylene can be tetramerized to cyclooctatetraene with certain nickel (II)-complexes, for example with nickel (II)-bis-acetylacetonate, nickel (II)-bis-salicylaldehydate, nickel (II)-cyanide and nickel (II)-acetylacetanolate. The formation of the cyclooctatetraene takes place between 80 and 120° C. at an acetylene pressure of 15 to 25 atmospheres. Various products are formed at the same time. In addition to about 70% cyclooctatetraene, one obtains up to 15% of benzene, a resinous polymer and a dark brown, insoluble mass. Further, small amounts are formed of styrene, 1-phenyl-1,3-butadiene, vinylcyclooctatetraene and traces of azulene. The reaction is limited practically to unsubstituted acetylene. Under similar conditions, substituted acetylenes afford lower linear polymers and benzene derivatives; in the copolymerization with acetylene corresponding mono- and disubstituted cyclooctatetraenes form. The catalysts lose their activity quickly.

Also definite nickel(O)-complexes, such as nickel(O)- bis-acrylonitrile and nickel(O)-bis-acrolein (suspension in tetrahydrofuran) permit acetylenes to polymerize (G. N. Schrauzer, J. Am. Chem. Soc. 81, 5310 (1959)). In general, higher temperatures (70–120° C.) and higher pressures (15–85 atmospheres) are required. The process takes place with acetylene in a manner that is stoichiometric rather than catalytic because only about 1 mol each of benzene and cyclooctatetraene form per mol of catalyst. The catalyst quickly loses its effectiveness. Phenylacetylene gives mainly a resinous polymer. Propargyl alcohol, phenylpropargyl aldehyde, propiolic esters and acetylenedicarboxylic acid esters react strongly, at times even explosively. Definite products have not been isolated. Also at lower temperature the components of these catalysts are built up into the final product. With tolan, for example, tetraphenylbenzonitrile or tetraphenylbenzaldehyde form in addition to hexaphenylbenzene.

It is therefore desirable to have stable catalysts which contain none of the organic components taking part in the polymerization. Further, it is important in certain monomers to be able to increase or decrease the activity of the catalyst in the course of the polymerization as desired.

It is further known (German Pat. 1,159,951, Dec. 27, 1963) that various types of acetylene compounds, e.g. propargyl alcohol, 1 - butinol - 3, 3-methyl-1-butinol-3, 4 - methyl - 1 - pentinol - 3, 2 - methyl - 1 - butenine-3, phenylacetylene, methyl propiolate, 3 - diethylamino-1-butine, 3-dimethylamino-1-propine, 3-piperidino - 1 - propine, propargyl ether, 1,4-butinedioldimethyl ether and 1,4 - butinediol can be trimerized along with complex nickel(O)-compounds with 2–4 attached atoms or groups, free of carbon monoxide (such as fumaronitrile, cinnamic acid nitrile, acrylonitrile, acrolein and duroquinone), among which at least one (preferably 2–3) is an organic phosphite, thiophosphite or phosphorous acid amide. This reaction requires a high temperature in the range of 70 to 150° C. The addition of the above-named Lewis bases to the nickel(O)-compounds prevents the formation of linear polymers completely. As a rule, equal parts of 1,3,5- and 1,2,4-trisubstituted benzene derivatives form. It is known that with strong Lewis bases, e.g. with trialkylphosphines, the benzene combination is also tied up; that is, practically no polymerization takes place with, e.g., nickel(O)- or nickel (II)-compounds. Linear polymers are not obtained with such catalysts.

Further, it is also known (J. R. Leto and M. F. Leto, J. Am. Chem. Soc., 83, 2944 (1961)), that catalysts of the formula $Ni(PX_3)_4$ (X=F, Cl, Br) and $Ni(PhPCl_2)_4$ convert methyl and ethyl propiolate into a mixture of the corresponding aromatic trimers and cyclooctatetraene derivatives. With this very specifically acting catalyst, acetylene, amylacetylene, phenylacetylene, propiolic acid, their potassium salt and amide, 3-chloro-1-propine, 3-hydroxy-1-propine, cyanoethylene, methyl 3-butinecarboxylate, diethyl acetylenedicarboxylate and 2-butine were not changed under the conditions applied (room temperature).

All catalysts hitherto described lose their activity quickly in cases where linear products are formed. It is supposed that in the side reactions the high molecular products render the catalyst inactive. It is important to have a catalyst which can always be regenerated during the course of its inactivation.

A linear, high molecular, solid polyacetylene has neither been prepared nor described with the catalyst described above.

By catalysts with iron chloride plus phenyl magnesium bromide (A. Job and G. Champetier, Bull. Soc. Com. M 176, 448 (1936)) or with triethylaluminum plus titanium tetrachloride (G. Natta, G. Mazzanti and P. Corradini, Rend. Accad. Naz. Lincei 15, 3 (1958)), a solid, black, powdery, linear polyacetylene has been obtained for the first time. The product was amorphous according to the investigation with X-rays. With the last mentioned Ziegler catalyst the portion of low molecular, oily side product amounted to about 20% and the yield of polyacetylene to about 3 g./g., based on the catalyst. This was not significantly increased by a longer reaction period. With Ziegler catalysts soluble red to black polymers were also obtained from 1,6-heptadiine; and from 1,7-octadiine and 1,8-nonadiine, insoluble, cross-linked polymers were obtained. (Ph. Theyssie and A. C. Korn-Girard, J. Poly. Sci. Part A, vol. 2, 2849 (1964)). The polymers of 1,6-heptadiine mentioned here earlier, which had been obtained by means of bis(triphenylphosphine)nickeldicarbonyl in boiling cyclohexane, was not used structurally. Various catalyst can form different polymers with the same monomers. Also diphenyldiacetylene could be converted to linear polymers; at the optimum proportion of Al/Ti=2.7 at 25°, a yield of about 33% was obtained. After about 15 hours the catalyst becomes ineffective, that is, no further chain growth occurs.

With a stereospecific catalyst, such as triethylaluminum+$TiCl_3$ or $VCl_3$, a mixture of polymers can be obtained with a poorer conversion of acetylene, which further contain a high percentage of oily products, which are separable from the black polymer by extraction with acetone, (G. Natta et al., loc. cit.). Thus, with a Natta catalyst, which consists of a suspension of 0.05 mol α-$TiCl_3$ and 0.05 mol triethylaluminum in 400 ml. of n-heptane, there were obtained at 35–40° C. in 10 hours, 21 g. of polymer, which held 18% of a substance extractable with acetone. Extension of the reaction time to 20 hours usually gave 24 g. of polymer, of which 20% was extractable. From the studies with various reaction times it is concluded that the catalyst applied is inactivated rather quickly. The solid, black polyacetylene obtained under these conditions and freed of catalysts showed only a weak crystallinity in the studies with X-rays.

A higher crystalline polyacetylene is said to be obtained in the use of a catalyst from titanium alcoholates soluble in hydrocarbons and a metallorganic compound. (Natta et al., Italian Pat. 530,753 (1955)). With a solution of, for example, 0.1 mol triethylaluminum and 0.04 mol tetrakis(propoxy)titanium in 500 ml. n-heptane, 35.5 g. of polymer were obtained at 45° C., in 15 hours, which polymer contained 4.5% of low molecular substances extractable with acetone. At higher reaction temperatures (75° C.), the yield increased to 48.5 g. and the extractable portion to 11.1%. At lower temperature (−20° C.), only 4 g. of polymer were obtained in 10 hours. The yields based on the catalyst are therefore low and in the best circumstances lie in the range of about 2 g./g.

Finally, it is known (L. B. Luttringer, J. Org. Chem. 27, 1591 (1962) that acetylene or acetylene derivatives can polymerize with a salt or complex of a metal of the VIII Group such as $NiCl_2$, bis(tricyanoethylphosphine-2)nickel dichloride, bis(tri - 2 - cyanoethylphosphine)nickel dibromide, bis(triphenylphosphine)nickel dichloride, bis(tri-n-butylphosphine)nickel dichloride in the presence of a manifold molar excess of a reducing compound, such as sodium borohydride and potassium borohydride in alcohol, acetonitrile or water. With bis(tri-2-cyanoethylphosphine) nickel (II) chloride and $NaBH_4$ (in a mol ratio of 1:27 to 1:47) in ethanol or acetonitrile, acetylene gave a high molecular solid, black, probably somewhat linear, polyacetylene. In an alcoholic or acetonitrile solution continuously saturated with acetylene, there was obtained only about 1 g. of polyacetylene, either with 43.8 g. of catalyst mixture at 40° C. in 4¼ hours or with 24.9 g. of catalyst mixture at 9° C. in 5½ hours. The increase of reaction time to more than four-fold and use of pressure gave also no higher yield, nor did the use of bromide instead of chloride. Monosubstituted alkylacetylenes with this process gave mostly lower linear and aromatic products, the type of which is mainly dependent on the acetylene used. In most cases the products consist of dimers and trimers. When linear products were formed, tetramers and higher homologs were observed in several cases, e.g. with 1-butine, 1-pentine and 1-heptine. In contrast thereto, the isolatable products with phenylacetylene were mainly 1,3,5- and 1,2,4-triphenylbenzenes, probably in addition to linear trimers. However, tarry by-products always form. The process is not suitable for the polymerization of propiolic acid and propargyl chloride. The latter reacted with the sodium borohydride. While aminoacetylene and 3-diethylamino-1-propine formed linear dimers and trimers, ethyl propiolate gave only the aromatic trimer. Cyclooctatetraene derivatives were not formed. Propargyl alcohol reacted in water almost explosively to form the corresponding 1,2,4- and 1,3,5-trimethylolbenzenes. 1,6-heptadiine dimerizes with relatively poor yields (15%) and only with 1,7-octadiine could a high molecular, linear polymer be obtained. Disubstituted acetylenes react according to this known process in a much less degree than do the monosubstituted. With 3-hexine a mixture forms of various products with lower yields (15%). Insofar as linear polymers form under typical conditions, these are hydrated through the hydride present in great excess, for example, in dimers of 1-heptine to 90% with 1 or 2 mols of hydrogen. In other cases a dehydrogenation took place, for example, in tetramers of 1-pentine under typical conditions it amounted to 1 mol of $H_2$/mol. Diphenylacetylene did not react at room temperature and gave hexaphenylbenzene at 78° C.

A new process has now been developed in which, in addition to cyclic trimers and tetramers, and also linear dimers, certain oligomers but especially high molecular, solid crystalline polyacetylenes can be obtained. The process obviates the disadvantage of the hitherto known process and fulfills the wishes expressed earlier. It permits the obtaining of a single product without application of pressure and at lower temperatures.

The process according to the invention rests in principle on an electrolytically initiated catalytic system, which consists essentially of (a) a definite transitional metal compound, (b) an electron donor and (c) possibly one or more auxiliary components. The catalytic system dissolved or suspended in a liquid medium forms an electrolyte which permits a sufficiently large flow of electric current. The electrolytic initiation is undertaken in a device provided with an electrolyzing device.

As transitional metal compounds, there are used those of transitional metals from Group IV$b$–VII$b$ and VIII of the Periodic System. All transitional metals are suitable if their salts or derivatives can form such complexes with an electron donor as can be dissolved in the necessary amount in a suitable liquid medium (possibly with the help of auxiliary components) as are dissociable in the form present during the electrolysis and do not permit the polymerization of the respective monomers by the formation of an all too stable complex, and the metal portion of which is again capable of being solvated after the cathodic discharge.

As transitional metal compounds suitable salts of carboxylic acids, e.g. acetates, propionates, butyrates, laurates, stearates, naphthenates etc.; salts of mineral acids, e.g. chlorides, bromides, iodides, fluorides, sulfates, nitrates etc. and other salts, such as cyanides, cyanates, thiocyanates etc. In case halides are used these can be prepared by a pre-electrolysis or by electrolysis during the polymerization. For this purpose the electrolyte contains an adequate amount of a reactive organic halide, e.g. methylene dichloride, benzyl chloride, ethyl bromide and the like, which then forms by electrocorrosion of a corresponding anode, e.g. of nickel, the desired metal halide, e.g. nickel chloride, nickel bromide.

In many cases it is suitable to use complexes of transitional metals or transitional metal salts with unsaturated aliphatic or alicyclic compounds, e.g. such as butadiene, cyclopentadiene, cyclobutadiene, cycloheptatriene, cyclooctatetraene, azulene etc. or with $\beta$-diketones, such as acetylacetone, 2,4-hexanedione, 3,5-heptanedione, isopropylacetylacetone, 3,5-octanedione, isobutylacetylacetone, 4,6-nonanedione, 1,3-diphenyl-1,3-propanedione etc.; or with $\alpha,\beta$-unsaturated nitriles, such as acrylonitrile, fumaric acid nitrile, cinnamic acid nitrile etc.; or with alkyl substituted p-benzoquinones, e.g. such as toluoquinone, p-xyloquinone, duroquinone etc.; or with arenenes, e.g. such as benzene, toluene, xylene, naphthalene etc.; further, with salicylaldehyde, acetoacetic ester, dimethylglyoxime, bis-N-alkylsalicylaldimine, 1,10-phenanthroline, $\alpha,\alpha'$-bipyriyl, nitrilotriacetic acid, ethylenediaminotetraacetic acid, 1,2-bis(diphenylphosphino) ethane, hydroxyethane-1,1-bis-phosphoric acid, the monoethyl ester of aminoethane-1,1-bis-phosphoric acid and other chelate forming agents. In contrast to the hitherto known catalysts, compounds can also be used which block not only one, but rather two, cis-positions in the active complex, without completely poisoning the catalyst thereby. Besides this the complex compounds (for example, nickel acetylacetonate), in contrast to the simple salts (for example, nickel dichloride, nickel dibromide), show a better solubility, and their handling is easier in many cases (e.g. in bis(cyclopentadienyl)titanium dichloride in contrast to titanium tetrachloride). Further, they have a significant influence on the type of final product.

It has been mentioned as a preface already that certain Ni(II)- and Ni(O)-complexes are able to convert acetylenes into the corresponding cyclic trimers and tetramers and/or lower molecular linear dimers or oligomers. As a rule, a mixture of different products is obtained. With, for example, Ni(II)bis-acetylacetone, Ni(II)-bis-cyanide, Ni(II)-bis-salicylaldehydrate or Ni(II)-bis-acetylacetatenolate there are obtained between 80 and 100° C. (optimally 85–95° C.) at an acetylene pressure of 15 to 25 atmospheres, based on the acetylene, about 70% of cyclooctatetraene, in addition to increasing amounts of benzene, up to 15% of a resinous polymer and a dark brown insoluble mass. The electrolytic initiation of such systems in the presence of the monomer leads, however, at room temperature and without application of pressure, either to other (and at the time new) products or, in cases where mixed products have been obtained until now, to single products, such as trisubstituted benzenes, cyclooctatetraenes, linear dimers, trimers, oligomers or high polymers and by copolymerization monosubstituted cycloheptatriens, mono- or disubstituted cyclooctatetraenes, tetrasubstituted benzaldehydes or tetrasubstituted benzonitriles etc.

The transitional metal compounds suitable for use in the reaction can have a valence which corresponds to their highest state of oxidation or to a lower one. Also mixtures of compounds of various transitional metals and mixtures of transitional metal compounds with various valences may be suitable. In the complexes the coordination positions may be partially or completely filled (e.g. up to 4 in the case of nickel) by attached atoms or groups.

The transitional metal compounds thus contain no covalent metal-hydrocarbon linkage (sigma-linkage) when they are introduced, in which fact they differ from the organic derivatives as they are applied hitherto in certain modifier Ziegler catalysts (e.g. $CH_3TiCl_3$, $(C_2H_5)_2TiCl_2$ etc.)

or as they are probably always formed in the ordinary Ziegler catalysts from the treatment of transitional metal halides (e.g. $TiCl_4$, $TiCl_3$) with metalloorganic compounds of I to III main groups of the periodic system (e.g. $LiC_4H_9$, $C_6H_5MgBr$, $Al(C_2H_5)_3$). Such metalloorganic compounds are not generally added to the reaction mixture in the process according to the invention.

Electron donors, preferably Lewis bases, serve as the second essential component of the catalytic system. All Lewis bases are suitable, which, with the transitional metal compound, are able to form a soluble coordination compound dissociable in the organic or aqueous solvent, the solution of which has the properties of an electrolyte.

Primary, secondary and tertiary amines enter into the question, including polyamines of the formula $RNH_2$, $R_2NH$ and $R_3N$, in which R represents aliphatic, cycloaliphatic, araliphatic, aromatic or heterocyclic radicals containing possibly further amine groups, phosphorus groups or other groups, in which two R's together may form a heterocyclic structure with the hetero-atom. Examples are: trimethylamine, triethylamine, tri-n-propylamine, triisopropylamine, tri-n-butylamine, triisobutylamine, tri-t-butylamine, trioctylamine, N,N-dimethylcyclohexylamine, N,N-diethylbenzylamine, N,N,N',N'-tetramethylethanediamine, N - methyl-N-propyl-N,N'-diethylethanediamine, $N^1,N^1$-dimethyl-$N^2,N^2$-dibenzylpropanediamine, pentamethylguanidine, N,N-dimethylaniline, N-ethyldiphenylamine, N-butylpyrrol, N-methylpyrrolidine, N-propylpyrazole, pyridine, lutidine, $\alpha,\alpha'$-dipyridyl, 4-methoxypyridine, 2-isopropylpyridine, morpholine, 3-t-butylmorpholine, pyrazine, pyrimide, pyrazine, N,N'-dioctylpiperidine, quinoline, isoquinoline, N-ethyltetrahydroquinoline etc., besides $NH_3$ and its analogs, in which 1 or 2 of the radicals attached to the nitrogen atoms are replaced by hydrogen atoms.

Further primary, secondary and tertiary phosphines, including polyphosphines of the formulas $RPH_2$, $R_2PH$ and $R_3P$; phosphites of the formula $(RO)_3P$; thiophosphites of the formula $(RS)_3P$; phosphates of the formula $(RO)_3PO$; thiophosphates of the formula $(RS)_3PO$, $(RO)_3PS$ and $(RS)_3PS$; aminophosphines of the formula $P(NH_2)_3$, $(RNH)_3P$ and $(R_2N)_3P$; phosphoric acid amides of the formula $(NH_2)_3PO$, $(RNH)_3PO$ and $(R_2N)_3PO$; thiophosphoric acid amides of the formulas $(NH_2)_3PS$, $(RNH)_3PS$ and $(R_2N)_3PS$.

Examples are: trimethylphosphine, triethylphosphine, tri-(2-cyanoethyl)phosphine, tri-(n-propyl)phosphine, tri-(r-butyl)phosphine, tri-(isobutyl)phosphine, tri(t-butyl)-phosphine, triphenylphosphine, tri-(o-cresyl)phosphine, tri-(p-cyanophenyl)phosphine, tri-(p-t-butylphenyl)phosphine, tri - (o - diphenylyl)phosphine, tri-(2,4-di-t-butylphenyl)phosphine, tri-(dimethylamino)phosphine, tri-(N-methylanilino)phosphine, tripyridinophosphine, trimorpholinophosphine etc.; also $PH_3$ and analogs, in which 1 or 2 of the radicals attached to the phosphorus atoms are replaced by a hydrogen atom; and phosphorus derivatives, in which the radicals mentioned are attached to the phosphorus atom through an oxygen or sulfur atom instead of through a carbon atom, or in which the radicals mentioned are attached to a P=O, P=S, As, Sb or Bi.

Further, phosphorus trihalides, phosphorus tricyanides, phosphorus tricyanates and phosphorus trithiocyanates of the formulas $XPH_2$, $X_2PH$ and $X_3P$, in which X means chlorine, bromine, fluorine, iodine, cyanide, cyanate or thiocyanate; analogs which contain a combination of these with the above mentioned organic radicals; analogs in which the radicals mentioned are attached to the P=O, P=S, As, Sb or Bt.

Further ethers and thioethers, including polyethers of the formulas ROR and RSR. Examples are: diethyl ether, di-n-butyl ether, diisobutyl ether, dimethoxyethane, dipropoxyethane, furan, tetrahydrofuran, tetrahydrofurfuroxy-tetrahydropyran, $\gamma$-dihydropyran, anisole, di-p-tolyl ether, etc.; analogs, which contain sulfur instead of oxygen.

The proportional parts of the transitional metal compound and of the electron donors in the catalyst system to be electrolytically initiated can be determined by the composition of the desired complex. However, it is also possible to use one or the other of the components in excess. The mol proportion can vary in the range of 0.001 to 100,000. In great excess the electron donor can be the solvent at the same time. By adjusting the relative proportions of the 3 components, that is of the acetylene monomers, the transitional metal compound and the Lewis base, varying systems can be obtained which determine the type of end product. The proportion of Lewis base to the acetylene monomers may be very small. It has been found that even the small amount of hydrogen phosphide present in technical acetylene is sufficient to convert acetylene in a solution of, for example, $NiBr_2$ in acetonitrile, after previous electrolytic initiation into a linear, high molecular, crystalline product. The electron donor can be introduced continuously with the monomer to be polymerized. Special advantages would also result if the transitional metal halide were allowed to form continuously in the way described earlier by electro-corrosion of a corresponding anode.

For carrying out of the process according to the invention, a vessel with an electrolyzing device is necessary. Known devices can be used. For large scale production, it is suitable to use an installation such as is customary for the preparation of perborate, in which the container is provided, if need be, with a closure having valves.

The electrodes can be made of platinum, aluminum, magnesium, titanium, iron, copper, mercury, nickel, cobalt, graphite and the like. The reaction container itself, or parts thereof, can serve as cathodes. The anodes and the cathodes can be of similar or dissimilar materials. Further, the electrodes can be provided with scraping device or with a vibrator to prevent the sticking of high molecular polymers. They can also be separated by a diaphragm. It is advantageous to stir the reaction solution strongly.

The process according to the invention is carried out in a liquid medium in which the polymer accumulates either as a solution, emulsion or suspension. Straight or branched chain paraffins which contain up to about 10 carbons per molecule may serve as liquid media. Such paraffins are propane, n-butane, n-pentane, isopentane, n-hexane, isohexane, 2,4,4-trimethylpentane, n-decane, etc.; cycloparaffins, such as cyclohexane, methylcyclohexane etc. Aromatic hydrocarbons, such as benzene, toluene, xylene, ethylbenzene, ethyltoluene, diethylbenzene, isopropylbenzene, isopropyltoluene, mono- and dialkylnaphthalene, as well as hydroaromatic hydrocarbons, such as tetralin, Decalin, etc., are also suitable. The solvents mentioned may contain inert substituents. Strongly polarized substituents, such as cyano-, trifluoromethyl-, carbonyl-, sulfonyl-, sulfoxyl-, amide-, ester groups and the liike, are preferred because the polar solvents with high dielectric constants give better electrolytes and are all useful as they do not render impossible, as a result of strong coordination, the replacement of at least one of the transitional metal ligands by the alkine to be polymerized during the electrolysis. As examples may be mentioned: acetonitrile, benzonitrile, acetone, diethylketone, dimethyl sulfone, dimethylsulfoxide, tetramethylenesulfoxide (sulfolan), dimethylformamide, dimethylacetamide, diethyl sulfate and ethyl acetate. Also suitable as solvents are: alcohols, such as methyl alcohol, ethyl alcohol, n-propyl alcohol, isopropyl alcohol; and water and aqueous solutions of organic solvents miscible with water. Fluid Lewis bases, too, especially ethers, as they have been listed earlier, can at the same time form a portion of the catalyst system and serve as solvents.

In general, a suitable medium is selected according to the electrolytic properties of the system to be prepared, according to the strength of the bond or participation in the spin orbit uncoupling of the ligands possibly present on the transitional metal, according to the reaction temperature at which the polymerization should be carried out, according to whether one wishes to obtain the end products either as soluble or insoluble phases; further, according to the kind of the monomer to be polymerized and finally also according to the type of end product desired.

Organic halides are to be mentioned as possibly successful auxiliary components in the charge. With these the desired transitional metal halides can be prepared batchwise or continuously through an electrolytic process as further below described. In many cases it is advantageous to add electrolytic conductors, such as amine salts, e.g. mono-, di- and tri-n-butylamine hydrochloride; mono-, di- and tri-tert.-butylamine hydrochloride; mono-, di- and tri-n-octylamine hydrobromide; or quaternary ammonium- or phosphonium salts, e.g. tetra-n-propylammonium chloride, dodecyltrimethylammonium bromide, tri-n-octyl ethylphosphonium chloride, or salts of organic sulfonic acids, e.g. sodium dodecylbenzenesulfonate, tetraisobutylammonium toluenesulfonate etc.

The process can be carried out batchwise or continuously. In a batch the actual catalyst is first prepared separately or in an electrolyzing container by mixing a transitional metal compound (e.g. nickel(II)bromide) with an electron donor (e.g. triphenylphosphine) in an inert solvent (e.g. acetonitrile) of the pre-catalyst. The addition of the components can be carried out in any desired sequence; there are rather weighty practical considerations in this. If necessary the solution is prefiltered. In this connection it can be worth the trouble to keep out air, carbon dioxide and moisture from the reaction container. Small portions of these materials can, however, be present in the reaction mixture and can even be useful under some conditions. Suitably the work is done in an inert atmosphere, e.g. in nitrogen, argon etc., or the monomer itself is used in those cases where it is a gas.

With the above compounds given as examples, a dark green solution of a complex-compound is obtained which, at the corresponding mol proportion of the components, can have the chemical formula of $(PPh_3)_2 \cdot NiBr_2$, for example. With such compounds, until now the corresponding cyclic derivatives were obtained only from acrylic acid and acetylene. Their catalytic activity for the polymerization of acetylene was attained only by an electrolysis in the presence of an alkine. The otherwise expected separation of the metal (nickel) at the cathode is completely prevented by the alkine. It was surprising since it is known that 2-butine-1,4-diol and propargyl alcohol in the electrolytic nickeling are added as a glazing material.

It has already been mentioned that the hitherto known catalysts lose their activity rather quickly and in certain cases must even be used in stoichiometric amounts. In nickel(O)-complexes the zero valent nickel atom is the active catalytic particle, which quickly loses its activity as a result of the formation of metallic nickel, which under the conditions prevalent until now can be re-solvated only with difficulty.

It is an advantage of the new process that the catalyst reaches its activity through electrolysis, because the electrolysis has turned against the processes taking place during the polymerization, which lead to the inactivation of the catalyst. The catalysis can be disturbed by change on the current density, and the duration of the electrolysis in a simple manner with great accuracy and uniformity. On this basis, the total amount of the precatalyst to be initiated electrolytically can be kept smaller, in many cases, than in the processes hitherto. Based on the monomer, it can vary between 0.01 and 2 mol percent. If desired, a higher proportion can be used in order then to have more room for play in the electrolytic activation. The concentration in the diluent can lie in the range of 0.01 to 5% by weight, and the desired conductivity of the electrolyte will be proportional thereto.

It was mentioned that the electron donor can be introduced simultaneously with the monomer into the reaction mixture. By the introduction of technical acetylene, which contains small amounts of hydrogen phosphide into a solution of nickel(II)bromide in acetonitrile in one study at room temperature, 24 g. of a solid polymer could be obtained by initiating the polymerization with a current strength which sufficed theoretically for the production of only 0.12 g. of zero valent nickel on the cathode. Only insignificant amounts of benzene and cyclooctatetraene were formed additionally.

It is known that complexes with strong coordination (strong field of ligands), as they exist, for example, in the extreme tetrahedral structure, are inactive. A relatively weak Lewis base, such as triphenylphosphine, permits a coordination deficiency of the transitional metal complex, e.g. nickel(O)bis-acrylonitrile, to be blocked so strongly that under conditions that are otherwise the same as in the cyclooctatetraene synthesis, 15 hours at 20 atmospheres, instead of cyclooctatetraene being formed with triphenylphosphine-nickel(O)-bis-acrylonitrile, benzene is now formed in addition to some styrene and a small amount of higher boiling fraction. With stronger Lewis bases, such as tri-n-butylphosphine, there are no more benzene derivatives formed. In contrast to this, the polymerization of acetylene always takes place in the process according to the invention after the electrolytic initiation of, e.g. the red solution of the complex $NiBr_2 \cdot 2PBu_3$ in acetonitrile.

In addition to acetylene itself, there are many other acetylene compounds useful as starting products for the new process. Examples are: the aliphatic straight chain and branched acetylenes, such as propine, 1-butine, 3-methyl-1-butine, 1-hexine, 2-hexine, 3-hexine and the corresponding higher alkylacetylenes, such as 1-dodecine, 3-dodecine, 4-dodecine, 1-octadecine, tert.-1-octadecine, 3-octadecine etc., including the di- and poly-acetylenically unsaturated representatives, which may be conjugated, such as 1,3-butadiine, 2,4-hexadiine, 1,3,5-hexatriine; or may be non-conjugated, such as 1,4-pentadiine, 1,5-hexadiine, 1,6-heptadiine, 1,7-octadiine, 1,8-nonadiine, 1,11-dodecadiine, 1,17-octadecadiine etc.; the aromatic acetylenes, such as phenylacetylene, diphenylacetylene (tolan), diphenyldiacetylene, alkinylnaphthalene, alkinylanthracene, including the di- and poly-acetylenically unsaturated representatives, such as o-, m- and p-dialkinylbenzenes, dialkinylnaphthalene, dialkinylanthracene etc.; the substituted acetylenes, in which one or more hydrogen atoms of the organic radical are replaced by the following atoms, groups or heterocyclic rings: chlorine, bromine, iodine, fluorine, =O, =S, —OH, —OR, —SH, —SR, —COOH, —COOR, —OCOR, —OCOOR, —CONH$_2$, —CONHR, —CONR$_2$, —CN, —SSH, —SSR, —SO$_2$OH, —SO$_2$OR, —SOR, —SO$_2$R, —NH$_2$, —NHR, —NR$_2$, —NO$_2$ (R=organic radical), pyrryl, furyl, thienyl, pyrazolyl, thiazolyl, oxazolyl, 1,2,3-, 1,2,4- and 1,3,4-triazolyl, pyridyl, pyranyl, thiopyranyl, piperidyl, piperazyl, morpholinyl, thiazinyl, pyrazinyl, pyrimidyl, pyridazyl, triazinyl, quinolyl, quinazolyl, quinoxalyl etc., including the partially or completely hydrogenated heterocyclenes; the acetylenes, which at the same time exhibit one or more ethylenic linkages, that is acetylenes in which one or more hydrogen atoms of the organic radical are replaced by alkenyl, cycloalkenyl, aralkenyl, or alkenaryl, such as vinyl, allyl, methallyl, propenyl, isopropenyl, 1-butenyl, 2-butenyl (crotyl), 3-butenyl, pentenyl, hexenyl, butadienyl, cyclopentenyl, cyclohexenyl, cyclohexadienyl, styryl, vinylphenyl, divinylphenyl, phenylallyl, allylphenyl etc.

Of the numerous compounds are the several mentioned below:

chloroacetylene,
3-chloropropine,
1,3-dibromopropine,
3-bromo-1-butine,
5-fluoro-1-pentine,
1,4-dichloro-2-butine,
o-, m- and p-chlorophenylacetylene,
3,4-dibromophenylacetylene,
propiolyl chloride,
tert.-butylpropiolyl chloride,
bromopropionic acid,
5-bromofuryl-2-propiolic acid,
1-butine-2-one,
di-(tert.-butylethenyl)-ketone,
methoxyactylene,
propargyl aldehyde,
phenylpropargyl aldehyde,
tetrol aldehyde, 3-methyl-3-pentene-1-in-5-al,
propargyl alcohol,
1-butine-2-ol,
1-butine-3-ol,
2-butine-1-ol,
2-butine-1,4-diol,
1-pentine-3-ol,
4-methyl-1-pentine-3-ol,
dimethyl-3-hexine-2,5-diol,
o-, m- and phydroxyphenylacetylene,
tris(tert.-butylethinyl)-carbinol,
1-ethinylcyclohexane-1-ol,
dipropargyl ether,
propargyl ethyl ether,
1,4-dimethoxybutine,
phenoxyacetylene,
propargyl-butylsulfide,
propiolic acid,
tetrolic acid,
3-butinecarboxylic acid,
stearolic acid,
phenylpropiolic acid,
carboxyphenylacetylene,
acetylenedicarboxylic acid,
1-decine-1,10-dicarboxylic acid,
vinylpropiolic acid,
methyl propiolate,
ethyl p-dimethylaminophenylpropiolate,
propargyl acetate,
2-butine-1,4-diacetate,
1,2-dibutoxyacetylene,
propyl 9-decinecarboxylate,
propiolic acid amide,
tetrolic acid amide,
3-butinecarboxylic acid diethyl amide,
aminoacetylene,
propargylamine,
3-dimethylamino-1-propine,
3-piperidino-1-butine,
cyanoethylene,
propargyl cyanide,
1,4-dicyano-2-butine,
1-cyano-2-methyloctene-1-ine,
1-cyano-2-methyl-3-pentine-2-ol,
o-, m- and p-cyanophenylacetylene,
ethinyl-3-pyrrol,
ethinyl-2-pyrrolidine,
propargyl-2-imidazole,
propargyl-4-imidazolidine,
ethinyl-3-pyridine,
ethinyl-5-pyrimidine,
propargyl-3-morpholine,
vinylacetylene,
isopropenylacetylene,
2-methoxy-1-butene-3-ine,
3-hexene-1-ine-5-ol,
styrylacetylene,
3-p-allylphenyl-1-propine.

The electrolytically initiated polymerization process can be carried out in a wide temperature range, for example from −75 to +300° C., and at pressures or partial pressures of fractions of an atmosphere to pressures of 350 atmospheres. Ordinarily temperatures higher than about 100° C. and pressures higher than about 30 atmospheres are not necessary. The type of product formed depends also on the temperature. At room temperature and normal pressure, linear high molecular polymers can be obtained. Although in the former processes the upper temperature limit in which the process might still be carried out was in many cases determined by the decomposition temperature of the catalyst, a limitation based on such a premise no longer exists in the present process, because the catalysts are contniually reformed or reactivated during the passage of the electric current. The stability of the catalyst may also be varied over wide limits by the type of ligands.

The type of the end product can be influenced decisively by the duration of electrolysis. With a relatively unstable catalytic system, it is possible to stop the polymerization momentarily by interrupting the direct current electrolysis possibly by a short depolarization. In a continuous process the electrolyte, which contains a certain amount of dissolved monomer, can stream by to the electrodes with a definite velocity. According to the duration of the time, which can vary from fractions of a second up to several minutes, the end products have a variable structure, since they may be aromatic, alicyclic or linear, and, in the last case, low or high molecular. Special advantages result from this also in the strongly exothermic and also often explosive polymerization, which until now could not be regulated in the manner described, particularly if the total amount of catalyst plus monomer were combined, as was the case, for example, in the closed vessel under pressure. With relatively stable catalysts the polymerization can be further carried out after interruption of the current input for a certain period (several seconds to hours).

The course of the polymerization can also be influenced in view of the desired end product, if the electrolysis is carried out with alternating current instead of with direct current or pulsating direct current. The alternating current can have a frequency varying from fractions of a period up to 5000 periods per second.

It has been found that technical acetylene, for example, can be converted, on catalysis initiated by alternating current (50 periods/second) with nickel (II) bromide dissolved in acetonitrile, at room temperature into a linear, black, high molecular, crystalline polyacetylene without the simultaneous formation of cyclooctatetraene as in the older processes. At higher frequencies (1000 periods/second) under the same conditions, no solid polyacetylene is formed. In case solid polyacetylene is formed, it contains, as a rule, lower valent transitional metals, whose content and distribution can be adjusted possibly through the above described procedure (duration at the electrodes, intensity of the electric current, direct current, pulsating direct current, alternating current, velocity of addition of the monomer). The contaminant of the polyacetylene by nickel (II) bromide formed on the anode can be prevented by means of a diaphragm. The nickel content of the polyacetylene can amount to about 6–20%, that is to about 6–30 acetylene units per 1 nickel atom.

The examples below are intended to explain the method of carrying out the invention rather than to bring a usable procedure into the technology. From the description hitherto given and the following examples, one skilled in the art will have no difficulty in finding the apparatus for a large scale production, especially since already known devices of this type can be used.

EXAMPLE 1

A glass container with an electrolyzing device according to FIG. 1 is used. The cathode consists of platinum foil (0.05 mm.). The anode consists of a rod of nickel. The electrodes are arranged as concentric cylinders (height 60 mm., diameter of the anode 10 mm. of the cathode 70 mm.).

The electrolyte solution is prepared with the exclusion of moisture in an atmosphere of nitrogen. Anhydrous nickel bromide (1.2 g. dried in a vacuum at 140° C.) and acetonitrile (250 ml. dried over phosphorus pentoxide and distilled) are put together and stirred until a green solution forms (about 1–2 hours). The solution is filtered through a glass frit (porosity 02) into the electrolyzing container. The clear solution is saturated with acetylene gas (impure, commercial carbide-acetylene). At an applied direct current potential of 14 volts, an electric current of 0.2 ampere flows through the cell. The electrolyte is immediately colored a deep black. Further acetylene is introduced, upon which a storng absorption takes place, and a fluocculent black suspension of solid polyacetylene forms with the evolution of heat. After 40 minutes the electric current is interrupted. At this time about 5 millifaradays of current have flowed through the cell. The pick up of acetylene continues for about 10 minutes more after the interruption of the current. At the anode the calculated amount of nickel (2.5 mg. atom) has dissolved off. The solid polyacetylene is removed by filtration, washed twice with acetone, and dried in vacuum at 40° C. 4.9 g. of a black, finely dispersed polyacetylene are obtained. According to analysis the product contains 81% C, 7% H, 4% Br and 6.6% Ni. The polyacetylene can serve as a semiconductor and as a carrying material for heterogeneous catalysts. It can also be added to artificial fibers. On washing with dilute hydrochloric acid the nickel and bromine are removed. The IR-spectrum shows a strong absorption band at 1012 cm.$^{-1}$. An X-ray powder diagram shows the strong reflection at an angle size which corresponds to a distance of 3.65 A. units between the peaks of maximum density. It is the case therefore of a linear, high molecular, transpolyacetylene. The electrolysis conditions can be adjusted and/or the solid polyacetylene can be treated, e.g. with a mineral acid, to adjust the nickel content to a desired level of from about 15% to parts per million or even parts per billion, if desired. The desired level of nickel my vary depending on the use, e.g. as a semiconductor the desired level may be quite low near the lower end of the range suggested above. With other transition metal catalysts the same levels of metal in the polymer are desirable and can be obtained. For other than semiconductor use desirable levels of metal in the polymer will normally be in the range of 0.1 to 15%. From the filtrate 0.3 g. of cyclooctatetraene are isolated. If the same study is carried out with alternating current (50 periods/second), no cyclooctatetraene is formed in addition to the solid polyacetylene (gas chromatographic estimation).

EXAMPLE 2

Impure acetylene is introduced into a solution of 3 g. of nickel dibromide in 260 ml. of acetonitrile and the solution electrolyzed for only 20 minutes. At this time 2.1 millifaradays of current have flowed through the cell. There were now introduced during 100 minutes more acetylene, and after filtration 24.5 g. of solid, black polyacetylene was obtained, which has a crystalline structure.

EXAMPLE 3

A glass container with an electrolyzing device according to FIGS. 2-6 is used. It consists of 2 parts which are separated by one diaphragm (filter paper, about 0.1 mm.) between perforated glass plates (7 holes with 15 mm. diameter each). The electrodes (distance 160 mm.) consist of thin foil plates (diameter 60 mm.), the cathode of platinum and the anode of nickel. The volumes of the anode and cathode portions amount to 275 ml. each. The addition of the electrolytes follows that in Example 1 with the use of 2.4 g. of nickel dibromide at 550 ml. of acetonitrile. At a P.D. of 135 volts the electric current amounts to 0.2 ampere. Impure acetylene is introduced in 2 portions. In the cathode part, black, insoluble polyacetylene forms at once. Only in the cathode portion is acetylene absorbed and used. In the anode portion the concentration of nickel dibromide rises in the course of the electrolysis, and it forms a precipitate of bright yellow nickel bromide. After 40 minutes, the electric current is interrupted. Up to this time about 5 millifaradays of current have passed through the cell. After filtering off of the cathodic suspension, one obtains 1.8 g. of black polyacetylene. In contrast to the product from Example 1, it contains no nickel bromide.

If the same study is carried out with purified acetylene (free of PH$_3$) and a catalyst of nickel bromide plus tri-n-butylphosphine (1:1), black, insoluble polyacetylene forms also.

EXAMPLE 4

The same apparatus was used in Example 1. The electrolyte consists of a solution of 0.55 g. of anhydrous nickel dibromide in 250 ml. of anhydrous tetrahydrofuran, freshly distilled over LiAlH$_4$. To this solution 15.0 g. of dimethylacetylene are added. The initial P.D. amounts to 300 volts, the initial current 35 milliamperes. The red solution becomes brighter, and the conductivity gradually sinks. A black precipitate forms at the cathode. The study is broken off after 78 hours. At this point 17.2 millifaradays of current have passed through the cell. The solid product of the solution is filtered off with exclusion of oxygen, washed with petroleum ether, and dried in a vacuum. One obtains 1.0 g. of poly-2-butine, which is extremely sensitive to oxygen. Analysis shows that the product contains 31.2% C, 4.24% H, 29.87% Br and 30.51% Ni. An X-ray powder diagram shows that the product is extensively crystalline and contains no metallic nickel. It contains monovalent nickel (a red solution with nickel (I) cyanide). The product can serve as a catalyst.

In a similar study cobalt (II) bromide is used instead of nickel (II) bromide. Hexamethylbenzene is obtained exclusively.

What is claimed is:

1. Solid linear crystalline trans-polyacetylene having nickel therein, and resulting from subjecting to electrolysis a complex compound of a nickel compound and an electron donor; and, acetylene, an acetylenic compound or mixtures thereof.

References Cited

UNITED STATES PATENTS

| | | | |
|---|---|---|---|
| 3,092,613 | 6/1963 | Kennerly et al. | 260—94.1 |
| 3,098,843 | 7/1963 | Luttinger | 260—94.1X |
| 3,174,956 | 3/1965 | Luttinger | 260—94.1X |
| 3,271,378 | 9/1966 | Daniels | 260—94.1X |
| 3,119,799 | 1/1964 | Natta et al. | 260—94.1 |

JAMES A. SEIDLECK, Primary Examiner

W. F. HAMROCK, Assistant Examiner

U.S. Cl. X.R.

260—41, 439; 204—59